US011091214B2

(12) United States Patent
Bettez et al.

(10) Patent No.: US 11,091,214 B2
(45) Date of Patent: Aug. 17, 2021

(54) LOCKING MECHANISM FOR A BICYCLE SHARING SYSTEM

(71) Applicant: Lyft, Inc., San Francisco, CA (US)

(72) Inventors: Jean-Sébastien Bettez, Hudson (CA); Tracy Van Dyk, New York City, NY (US); Michael Frumin, Brooklyn, NY (US); Peter Luedtke, Brooklyn, NY (US); Jacob Robert Doctoroff, New York City, NY (US)

(73) Assignee: Lyft, Inc., San Francisco, CA (US)

( * ) Notice: Subject to any disclaimer, the term of this patent is extended or adjusted under 35 U.S.C. 154(b) by 133 days.

(21) Appl. No.: 16/179,564

(22) Filed: Nov. 2, 2018

(65) Prior Publication Data

US 2019/0127002 A1 May 2, 2019

Related U.S. Application Data

(60) Provisional application No. 62/580,994, filed on Nov. 2, 2017.

(51) Int. Cl.
*B62H 5/00* (2006.01)
*B62H 3/02* (2006.01)
(Continued)

(52) U.S. Cl.
CPC .................. *B62H 5/00* (2013.01); *B62H 3/02* (2013.01); *B62H 3/04* (2013.01); *E05B 47/0001* (2013.01);
(Continued)

(58) Field of Classification Search
CPC ... B62H 5/00; B62H 3/02; B62H 3/04; B62H 2003/005; B62H 5/005; B62H 5/06;
(Continued)

(56) References Cited

U.S. PATENT DOCUMENTS

| 640,775 A | 1/1900 | Kerekes |
| 1,499,155 A | 6/1924 | Christianson |

(Continued)

FOREIGN PATENT DOCUMENTS

| CA | 2742511 A1 | 5/2008 |
| CA | 2699712 A1 | 10/2009 |

(Continued)

OTHER PUBLICATIONS

International Search Report and Written Opinion for International Application No. PCT/CA2014/000856 dated Mar. 10, 2015.
(Continued)

*Primary Examiner* — Lloyd A Gall
(74) *Attorney, Agent, or Firm* — Haynes and Boone, LLP

(57) ABSTRACT

A lock for securing a bicycle to a dock. The lock consumes little power in operation, with transitions between states in which a bicycle is locked to a dock and released from the dock being driven predominately by force applied to the bicycle by a user. Force applied to the bicycle may drive a latch within the lock to move between a latched and unlatched position. A locking member may be driven in one direction by an actuator and retained by an arm that blocks movement of the locking member. The locking member may be driven in the other direction by spring force, when the locking member is released by movement of the arm, which is coupled to the latch and therefore driven by a user applying force to a bicycle. As a result, a small battery may supply power to the actuator and to communication and control circuitry.

21 Claims, 12 Drawing Sheets

(51) Int. Cl.
- *E05B 47/00* (2006.01)
- *B62H 3/00* (2006.01)
- *B62H 3/04* (2006.01)

(52) U.S. Cl.
CPC .............. *B62H 2003/005* (2013.01); *E05B 2047/0069* (2013.01)

(58) Field of Classification Search
CPC .......... B62H 2700/00; B62H 2700/005; B62H 3/00; E05B 47/0001; E05B 71/00; E05B 47/0603
USPC .............................................. 70/62, 233–236
See application file for complete search history.

(56) References Cited

U.S. PATENT DOCUMENTS

| | | | |
|---|---|---|---|
| 2,145,173 A | 1/1939 | Hankins | |
| 3,521,511 A | 7/1970 | Deuring et al. | |
| 3,709,152 A | 1/1973 | Gutridge | |
| 3,802,232 A | 4/1974 | Mattson et al. | |
| 3,944,079 A | 3/1976 | Boslough | |
| 4,269,049 A | 5/1981 | Henderson | |
| 4,830,167 A | 5/1989 | Lassche | |
| 5,323,915 A | 6/1994 | Fortune, Sr. et al. | |
| 5,553,715 A | 9/1996 | Brotz | |
| 5,841,351 A | 11/1998 | Rey | |
| 6,327,879 B1* | 12/2001 | Malsom | E05B 65/0811 292/197 |
| 6,338,261 B1 | 1/2002 | Liu | |
| 6,384,717 B1 | 5/2002 | DeVolpi | |
| 6,962,066 B2 | 11/2005 | Larsen et al. | |
| 7,210,316 B1 | 5/2007 | Falconer et al. | |
| 7,434,674 B1 | 10/2008 | Bain | |
| 7,748,511 B1 | 7/2010 | Maher | |
| 7,770,422 B1 | 8/2010 | Sierra | |
| 7,823,937 B2 | 11/2010 | Vitry | |
| 7,836,736 B2 | 11/2010 | Humphris | |
| 7,898,439 B2* | 3/2011 | Bettez | B62H 3/00 340/999 |
| 8,061,499 B2 | 11/2011 | Khairallah et al. | |
| 8,272,491 B2 | 9/2012 | Khairallah et al. | |
| 8,517,162 B2 | 8/2013 | Khairallah et al. | |
| 8,547,228 B2 | 10/2013 | Brodzik et al. | |
| 8,678,205 B2 | 3/2014 | Mercat et al. | |
| 8,966,947 B2* | 3/2015 | Karcz | E05B 65/0007 70/135 |
| 9,598,128 B2 | 3/2017 | Assenat et al. | |
| 10,689,046 B1* | 6/2020 | Luedtke | B62H 5/20 |
| 10,723,399 B2* | 7/2020 | Assenat | B62H 3/00 |
| 2007/0220933 A1 | 9/2007 | Gagosz et al. | |
| 2008/0018440 A1 | 1/2008 | Aulbers et al. | |
| 2008/0042450 A1 | 2/2008 | Jianping et al. | |
| 2008/0042452 A1 | 2/2008 | Moon et al. | |
| 2010/0228405 A1 | 9/2010 | Morgal et al. | |
| 2011/0037240 A1 | 2/2011 | Kritzer et al. | |
| 2011/0286789 A1* | 11/2011 | Johannes Kooijmans | B62H 3/02 403/319 |
| 2015/0152668 A1 | 6/2015 | Assenat et al. | |
| 2015/0167351 A1 | 6/2015 | Singh et al. | |

FOREIGN PATENT DOCUMENTS

| | | |
|---|---|---|
| CA | 2699712 C | 10/2011 |
| CN | 202731467 U | 2/2013 |

OTHER PUBLICATIONS

International Preliminary Report on Patentability for International Application No. PCT/CA2014/000856 dated Jun. 9, 2016.

* cited by examiner

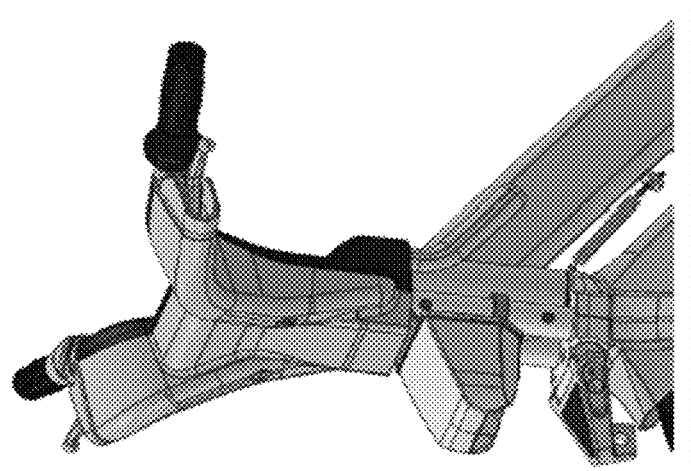
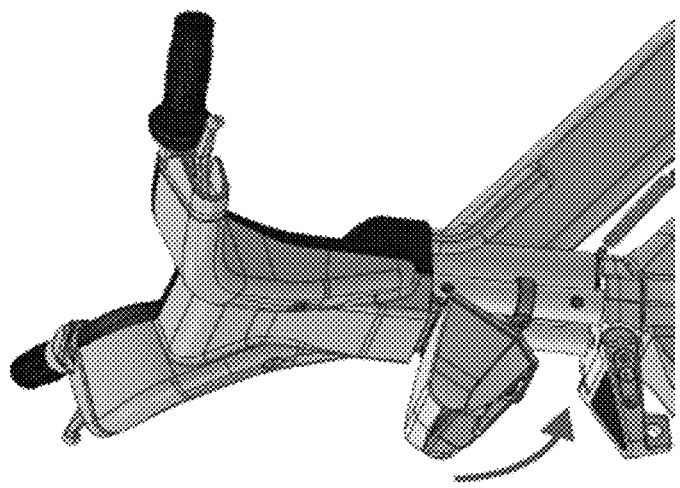
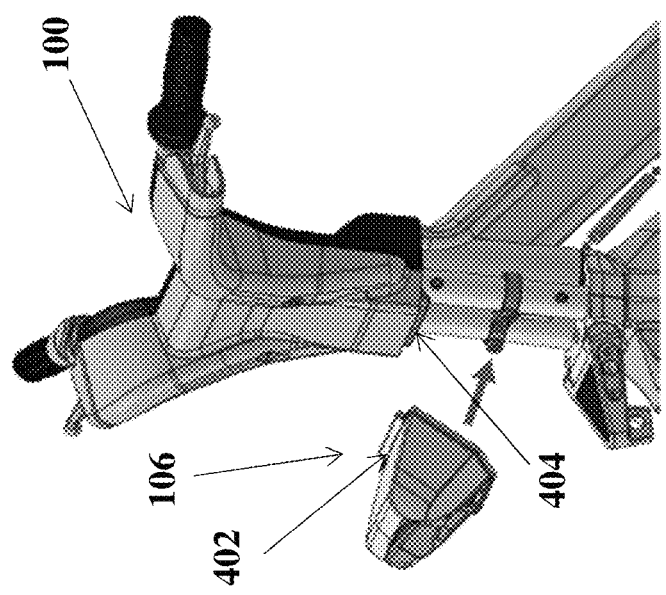

| State | Mechanical States - All | | | Valid State if Working Correctly? |
|---|---|---|---|---|
| | Latch (O/C) | Locking Slider (O/C) | Motor (R,L,O) | |
| 1 | Open | Open | Ready | No |
| 2 | Open | Open | Locked | No |
| 3 | Open | Open | Open | Yes |
| 4 | Open | Closed | Ready | Yes |
| 5 | Open | Closed | Locked | Yes |
| 6 | Open | Closed | Open | No |
| 7 | Closed | Open | Ready | No |
| 8 | Closed | Open | Locked | No |
| 9 | Closed | Open | Open | Yes |
| 10 | Closed | Closed | Ready | Yes |
| 11 | Closed | Closed | Locked | Yes |
| 12 | Closed | Closed | Open | No |

Fig. 12

LOCKING MECHANISM FOR A BICYCLE SHARING SYSTEM

CROSS-REFERENCE TO RELATED APPLICATION

This application claims priority to and the benefit of U.S. Provisional Application Ser. No. 62/580,994, filed Nov. 2, 2017, entitled "LOCKING MECHANISM FOR A BICYCLE SHARING SYSTEM." The entire contents of this application is incorporated herein by reference in their entirety.

FIELD

Embodiments disclosed herein are related to locking systems for bicycles, such as may be used in a bicycle sharing system.

BACKGROUND

Recently, bicycle share systems have been deployed in many cities, enabling people to pick up and return bicycles to docking stations in public areas. With many systems, including those operated by the assignee of this application, a user may return a bicycle to a different docking station than where it was obtained, providing significant flexibility for the user.

In such systems, the docking stations have a locking system, controlled by a pay station that is, in turn, connected to central control system. This communication through the docking system enables the bike share operator to control unlocking of docks to release bicycles to only authorized users and perform other functions such as tracking whether a bicycle is in use or has been returned.

In other bicycle share systems, no docking stations are used. Rather, bicycles contain components that can remotely disable their operation. Users may leave bicycles in any location when they are done using them.

SUMMARY

The current disclosure discusses a lock for removably securing a bicycle to a structure. In some embodiments, the lock has a housing configured to mount it to the bicycle. Movably mounted to the housing is a latch that can move between a latched and unlatched position. Also moveably mounted to the housing is a locking member that can move between a locked position where it blocks movement of the latch, and an unlocked position. An arm is attached to the latch and adjacent to the locking member, blocking its movement such that it stays in the locked position when the latch is in the latched position. There is also an actuator coupled to the locking member that is configured to drive the locking member into at least one of the locked and unlocked positions.

In other embodiments of the lock, the lock includes a housing configured to mount to the bicycle. Within the housing is a latch that is moveably mounted to the housing such that it can move between a latched and unlatched position. Also within the housing is a locking member movably mounted to the housing between a locked position in which it blocks movement of the latch, and an unlocked position. A spring biases the locking member towards the locked position. An arm is attached to the latch such that the arm is positioned to block the locking member from moving from the unlocking position to the locked position when the latch is in the unlatched position. Rotating the latch to the latched position rotates the arm away from the locking member, allowing the locking member to enter its locked position.

To secure a bicycle to a structure according to some embodiments of the lock, a first locking section mounted to the bicycle is aligned with a second locking section mounted to the structure. The first locking section comprises at least a rotatable latch, and the second locking section comprises at least a complementary latching member. The rotatable latch is rotated in response to a force generated by bringing the first locking section and the second locking section together such that the latch is rotated into engagement with a complementary latching member of the second locking section. An arm is rotated with the latch to remove a restraint on the motion of a locking member, allowing the locking member to move into a locked position where the locking member blocks rotation of the latch into an unlatched position.

To reversibly unsecure a bicycle from a structure according to some embodiments of the lock, an actuator within a first locking section mounted on the bicycle causes a locking member within the first locking section to move to an unlocked position out of engagement with a latching member. A camming surface on the latching member presses against a camming surface of the structure, generating a force to rotate the latch. When the latch is rotated in response to the force, an arm coupled to the latch shifts to an unlocked position adjacent to the locking member, preventing the locking member from extending into a locked position.

BRIEF DESCRIPTION OF DRAWINGS

FIGS. 4A-4C are left front perspective views of an exemplary embodiment of a lock during a process of attaching the lock to a bicycle, with the bicycle partially cut away;

FIG. 12 is a table illustrating possible mechanical states of the locking system and whether they represent normal or errant states in accordance with some exemplary embodiments.

DETAILED DESCRIPTION

Figure 1:
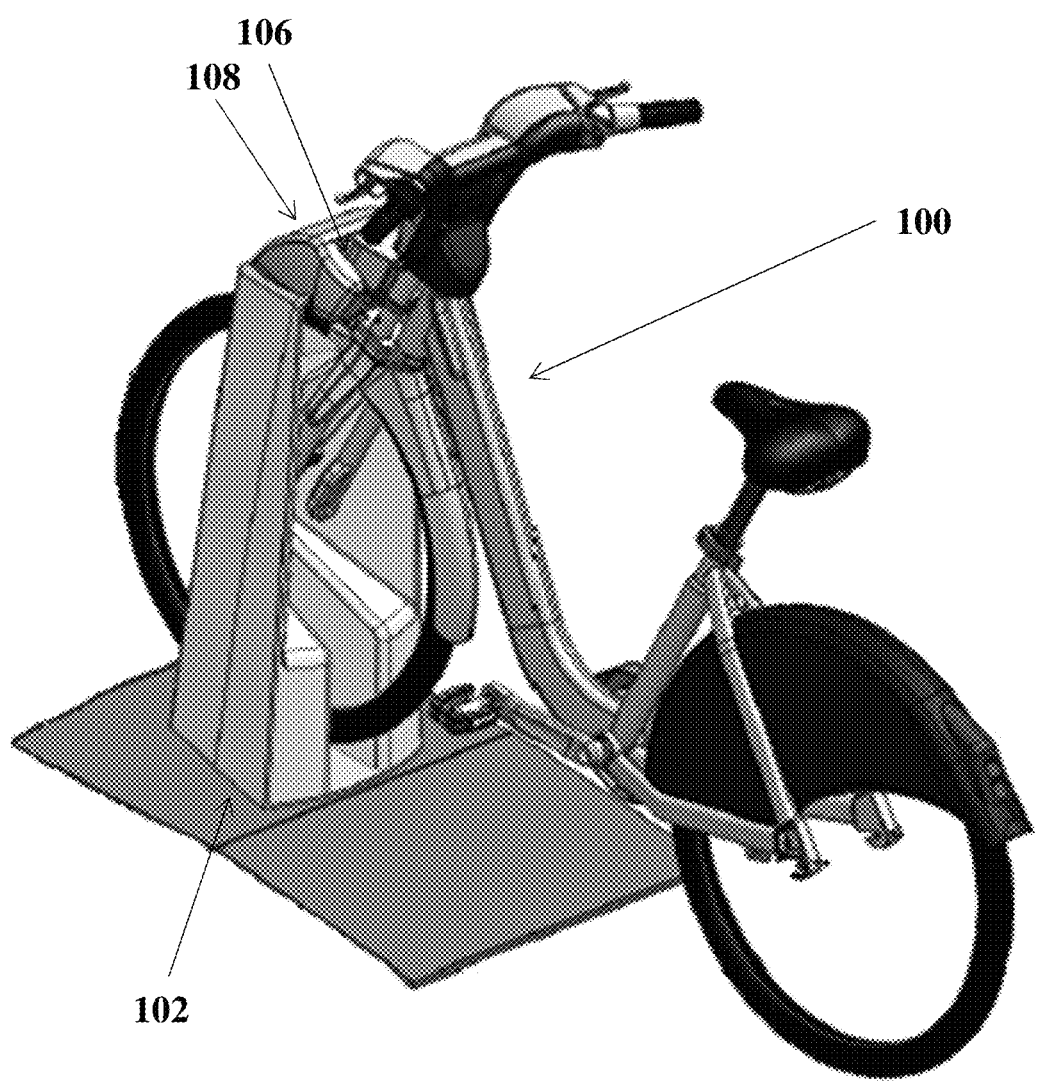
FIG. 1 is an overall perspective view of an example of a bicycle and dock locked together with an embodiment of the lock system.

The inventors have recognized and appreciated that a novel design for a lock can improve a bicycle share system by reducing operating costs and enabling more bicycles to be available for users.

The inventors have recognized and appreciated that current bicycle share systems that have most of their locking hardware located on the docks require more docks than bicycles. This is to ensure that there are enough docks for users returning bicycles in different locations. However, such a configuration requires more copies of the locking hardware at the dock locations than there are bicycles in operation, leading to an inefficient deployment of capital equipment.

The inventors have also recognized and appreciated that systems with no docking stations results in an unacceptably high rate of lost or stolen bicycles. Additionally, having no fixed locations at which bicycles need to be returned when not in use creates other operational complexities, such as inspecting bicycles to perform preventative maintenance or to find bicycles that are in need of repair. Even though the capital expenses of such system are lower than a system deploying docks containing most of the locking hardware, enabling more bicycles to initially be deployed, it has been found over time that fewer bicycles are actually available for use, given the numbers of bicycles that go out of service as a result of being damaged, stolen or otherwise dropped off where they are not in use.

The inventors have recognized and appreciated that a bicycle share system could have a favorable ratio of capital costs to bicycles in use by designing a lock for mounting to a bicycle. The lock may be in wireless communication with a control station and may perform some or all of the functions of a lock such as might have been installed in a dock in other systems.

The lock may have a low power design. In accordance with some embodiments, the lock may have a low enough power draw that it may be powered by a battery that is in turn recharged by a dynamo that is driven by motion of the bicycle. Low power may be provided by a limited number of mechanically driven parts. Rather, much of the power required to engage and disengage the lock may be provided by a person pushing or pulling the bicycle. Mechanical motion may be limited to driving a locking member that, when driven, unblocks other components from moving out of an unlatched position. Alternatively or additionally, mechanical motion may be used to drive the locking member to block other components from moving. Spring members may bias members when not mechanically driven such that they move into the required position, except when blocked or mechanically driven.

A dock may still be used, creating locations at which bicycles may be returned and, thus, located by other users or for maintenance. The dock may include relatively few components and may not require any electronics or control components. In some embodiments, the dock may not require any source of power, further reducing cost and ease of deployment.

The dock, however, may have complementary locking members, to securely engage with the lock on the bicycle. Moreover, the dock may include a tag, such as an RFID tag, enabling a bicycle secured to the dock to detect and report its location and status (e.g. locked to the dock or not locked) accurately. These components may be passive, enabling low cost docks. The simplicity of the dock enables docks to be deployed in clusters of any suitable size, including one or more docks. Despite the simple dock design, docks may be widely deployed and may aid in keeping bicycles in service.

In accordance with some embodiments, the locking system may include two mating components. One such component, the lock, may be mounted to the bicycle. A second, complementary component may be part of, or attached to, a permanent or semi-permanent structure, such as a dock. To initiate locking, the user may align the lock with the complementary component and roll the bicycle into the dock, thereby sliding the lock into engagement with the complementary component. As the two components come together, a latch within the lock, which may be attached to the bicycle, comes into contact with, and latches, onto a complementary latching member attached to the dock. The latch may engage the complementary latching member. The latch may then be locked in place, preventing the lock, and the bicycle to which it is attached, from being removed from the dock.

In some embodiments, the lock may include elements that lock the latch in its latched position. These components may include a locking pin and an arm attached directly or indirectly to the latch. When the system is in its unlocked configuration, the locking pin may be retracted within a section of the first locking module's housing, and is prevented from escaping by the arm obstructing its extension from the housing. As the latch rotates downwards to engage the complementary latching member, the arm rotates with the latch, eventually leaving the locking pin free to move. The locking pin then extends out of its sheath and blocks the rotation of the latch out of its latched position, preventing the bicycle from becoming uncoupled from the dock so long as the locking pin is extended in the locked position.

When a user desires to rent a bicycle, a command may be sent to a controller located within the bicycle. The controller then causes the locking pin to retract, leaving the latch unobstructed and free to rotate to its unlocked position. As the user pulls the bicycle outwards and away from the dock, the latch rotates away from the complementary latching member, freeing the bicycle. Additionally, the rotation of the latch also moves the arm back into a position to obstruct the retracted locking pin, preventing it from extending through the course of normal bicycle use.

In some embodiments, the locking pin may be retracted by activating an actuator, which may be a linear actuator or a rotating motor attached to a ball screw or acme screw, or other suitable actuator. In this embodiment, the actuator imparts linear motion to the pin. Such motion may require a relatively small amount of energy, because the pin has relatively low mass and is subjected to relatively low friction as it slides. Other motions may be driven by spring activated. The locking pin, for example, may be spring biased to extend into its locking state when not restrained by the arm or being driven by the actuator. Similarly, in some embodiments the latch may be spring biased into an unlatched position.

In other embodiments, motion of the latch into the unlatched position may be driven by the user moving the bicycle. Motion of the bicycle, for example, may force a camming surface on the latch against a camming surface on the complementary latching member, translating force on the bicycle into a rotational torque on the latch. Similarly, other motions may be driven by motion of the bicycle imparted by the user. Such motions may include rotating the latch into a latched position, for example.

Turning now to the figures, non-limiting embodiments are described in further detail. It should be understood that the various features and components described in regards to the figures may be arranged in any desired combination and that the current disclosure is not limited to only those embodiments depicted in the figures.

FIG. 1 is a perspective view of an exemplary bicycle and dock using an embodiment of the lock system. Bicycle 100 is shown stationed within dock 102. A lock is positioned within the first locking module 106 mounted to the bicycle. A complementary latching member is a part of a second locking module 108 mounted to the dock. It should be understood that a variety of bicycle shapes and dock shapes can be used and the current disclosure should not be limited to the depicted versions. Moreover, while first and second locking modules are described, it is not a requirement that the components described herein be separately formed as modules. As complementary latching member may be integrally formed on the dock or implemented in any other suitable way.

Figure 2A:
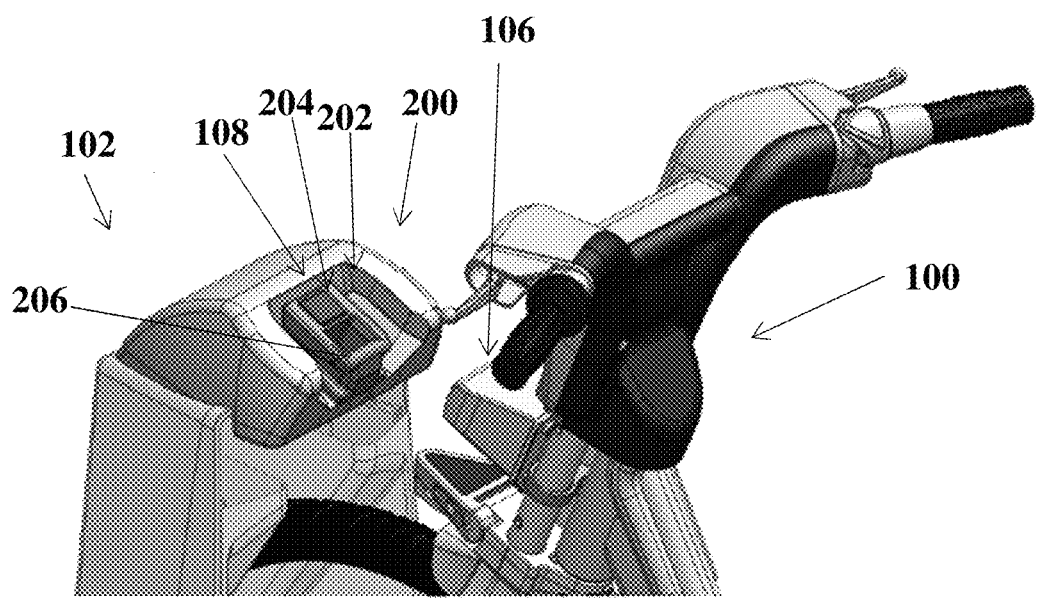
FIG. 2A is a perspective view of an embodiment of the lock system mounted to a bicycle prior to mating with a dock, shown from the left rear, with the bicycle and dock partially cut away for clarity.
Figure 2B:
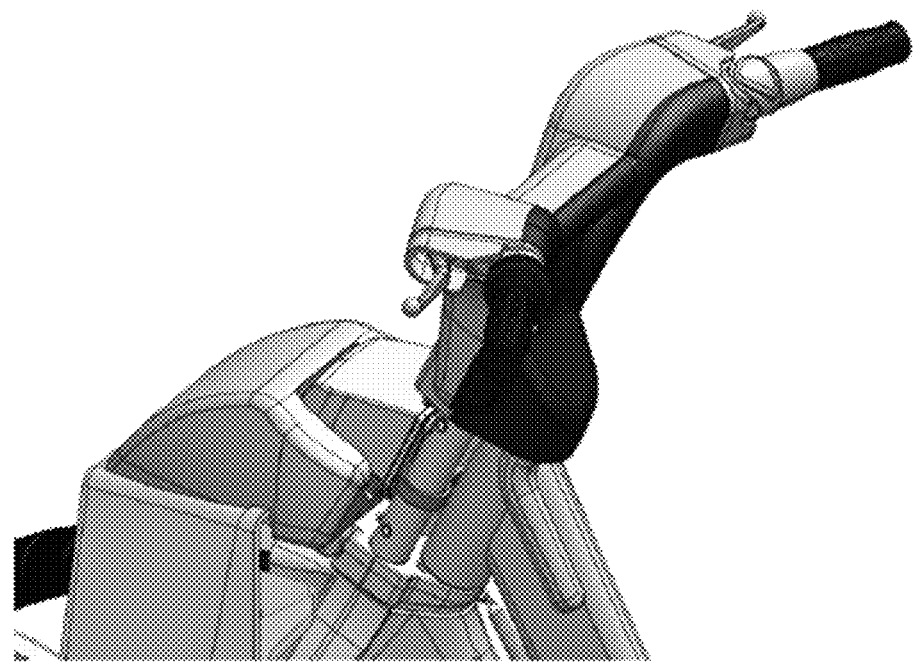
FIG. 2B is a perspective view of the lock system of FIG. 2A after mating.

FIGS. 2A and 2B show a close-up of the bicycle approaching the dock and mating with the dock respectively. As the user brings bicycle 100 towards dock 102, the user also aligns the leading edge of first locking module 106 with the receiving section 200 of second locking module 108.

In the illustrated embodiment, receiving section 200 includes a latch receiver 204 that includes a complementary latching member 206. Around the latch receiver 204 is recess 202 that is shaped to receive at least a portion of a housing of first locking module 106 when the two locking modules are mated. As the bicycle 100 engages with the dock 102, the two locking modules engage as well, locking the bicycle to the dock. In the depicted embodiment, the first locking module is shown on the front of the bicycle, but it could be located anywhere on the bicycle that allows the bicycle to stably mate with a dock.

Figure 3A:
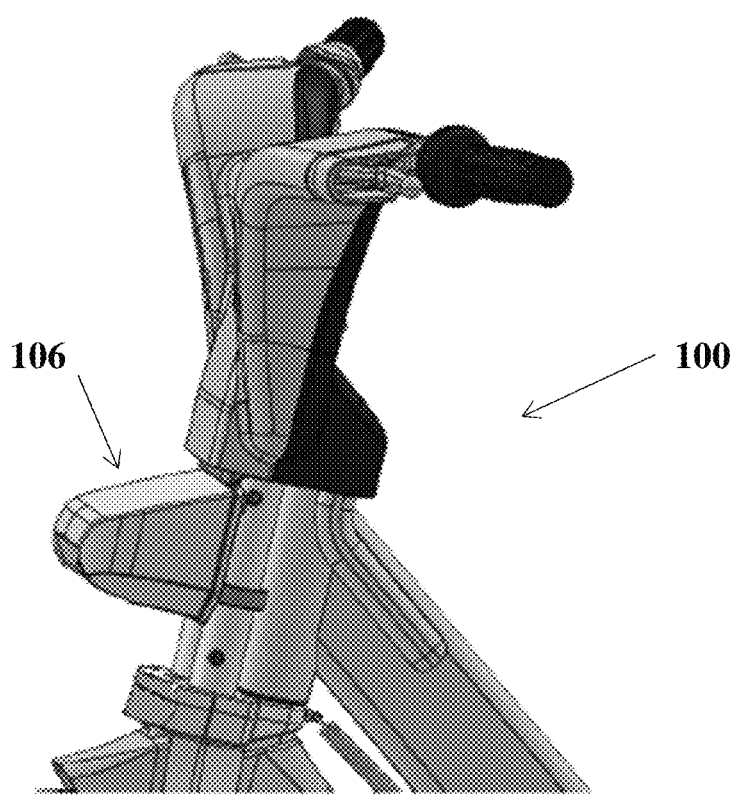
FIG. 3A is a left side perspective view of an exemplary embodiment of the lock attached to a bicycle, with the bicycle partially cut away.
Figure 3B:
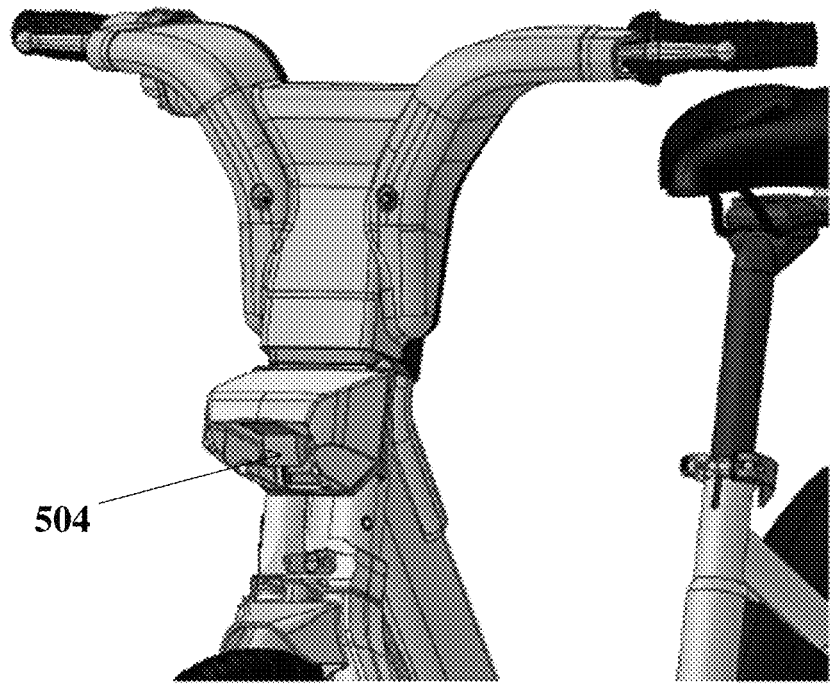
FIG. 3B is a left front perspective view of the lock of FIG. 3A.

FIGS. 3A and 3B show a side and front view of the first locking module 106 on bicycle 100.

FIGS. 4A-4C show a simple process for attaching the first locking module 106 to the bicycle 100, in accordance with some embodiments. At the top of first locking module 106 is bar 402 which corresponds to cavity 404 on the front of the bicycle 100. First locking module 106 is angled to slide bar 402 into cavity 404, and then rotated into place along the front of the bicycle to secure bar 402 within cavity 404 and keep the top of the first locking module in place. Tamper resistant screws 508, as seen in FIG. 5A, are then used to further secure the attachment, but other securing methods are contemplated including adhesives, welding, bolts, and any other attachment system.

Figure 5B:
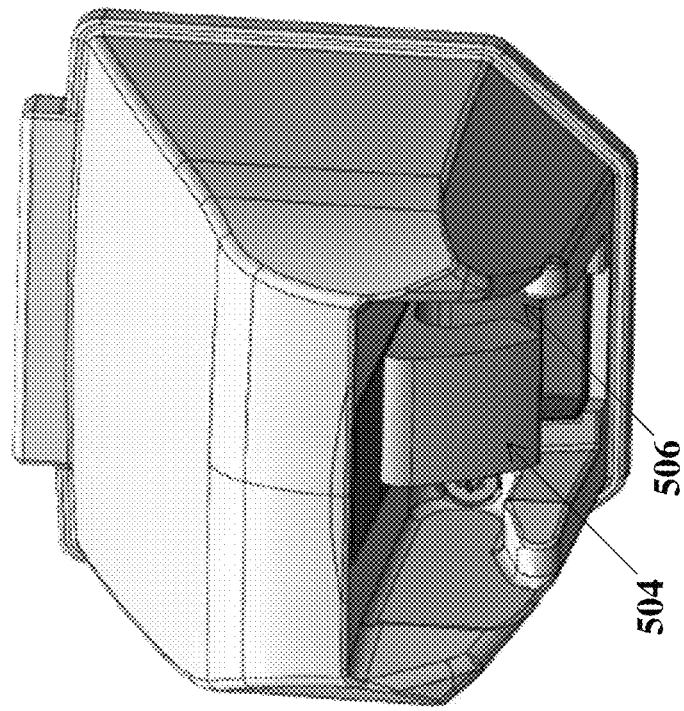
FIG. 5B is a lower left front perspective view of the first locking module of FIG. 5A in the locked position.
Figure 5A:
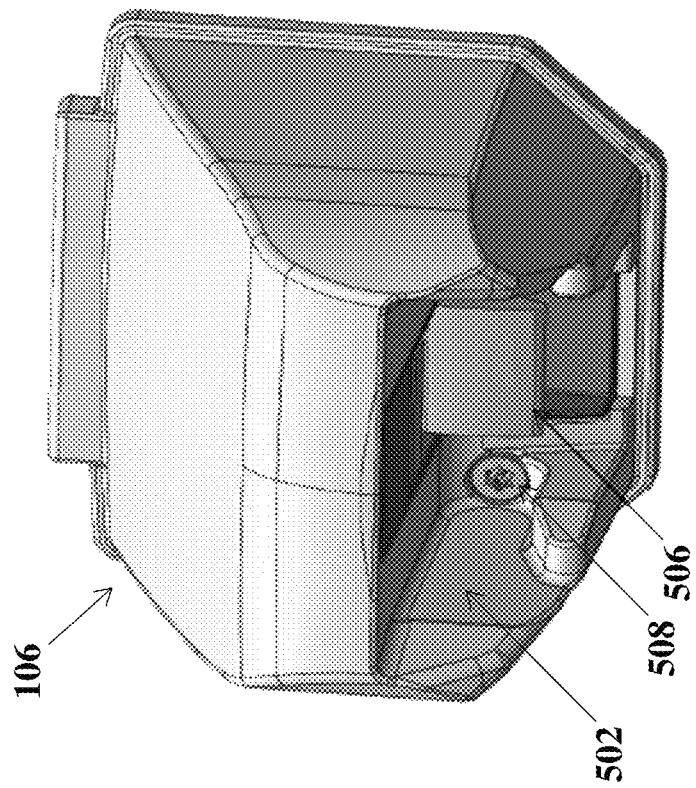
FIG. 5A is a lower left front perspective view of an exemplary embodiment of a lock in the unlocked position.
Figure 6:
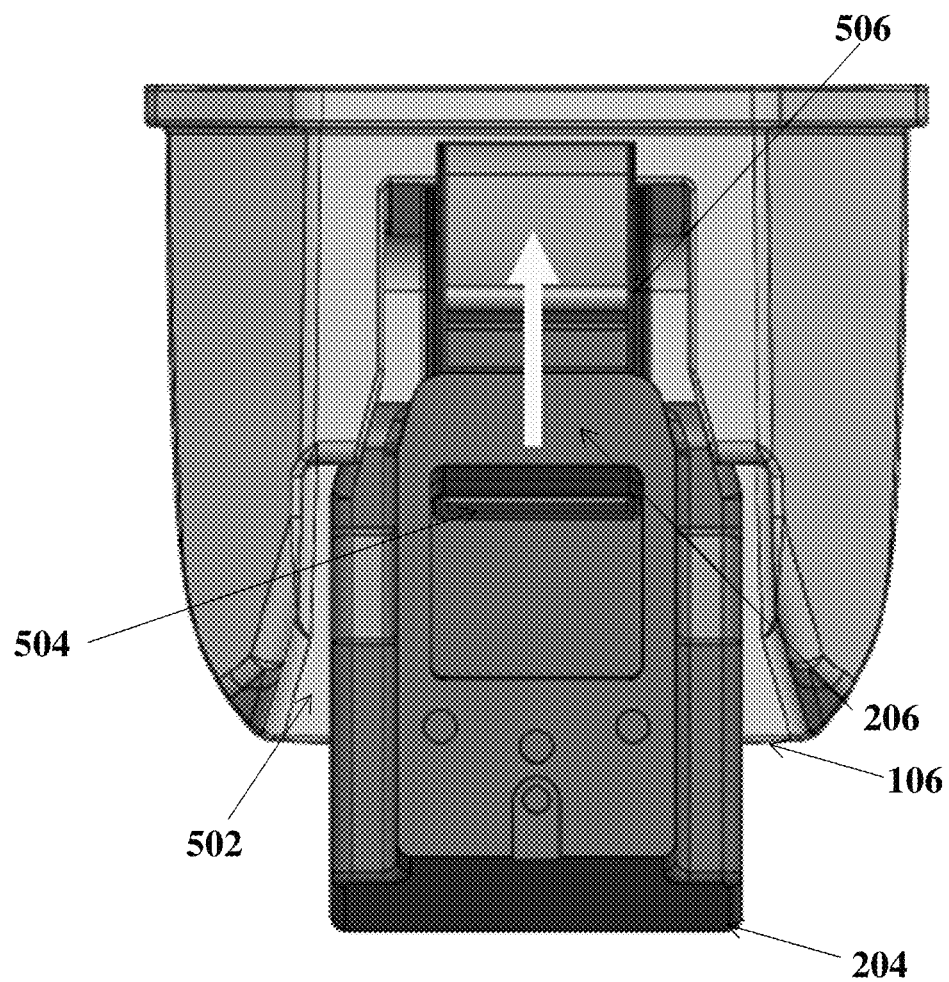
FIG. 6 is a bottom view of the mating portions of the lock of FIG. 5A, with a portion of a dock, with the dock partially cut away.

FIGS. 5A and 5B show an enlarged view of the first locking module 106 in isolation, and FIGS. 6, 7A, 7B, and 8 shows the first locking module mating with the second locking module 108 in detail. The underside of the leading edge of the first locking module includes a shaped entrance way 502 that is shaped to complement latch receiver 204 as seen in FIGS. 6 and 7. Toward the rear of entrance way 502 is latch 504 and lever 506. Lever 506 is coupled to latch 504. In the embodiment illustrated, latch 504 and lever 506 are integrally formed of the same member. FIG. 5A shows the first locking module in the unlocked position with the latch open. In FIG. 5A, latch 504 has been rotated into an unlatched position such that it is rotated out of entrance way 502. Lever 506 is rotated into entrance way 502 such that movement of a complementary latching member into entrance way 502 will engage lever 506, applying force to lever 506 such that latch 504 will rotate into entrance way 502, as shown in FIG. 5B.

FIG. 5B shows the first locking module with the latch closed. For simplicity, the complementary latching member is not shown in FIG. 5B, such that latch 504 is not shown engaged with the complementary latching member. However, in contemplated embodiments, pushing the lock into a docking station with a complementary latching member to engage lever 506 and rotate latch 504 into engagement with the complementary latching member. Such motion is illustrated in FIG. 6.

As seen in FIG. 6, as the first and second locking modules come together, a complementary latching member, illustrated here as a portion of latch receiver 204, slides through the entrance way 502 and encounters lever 506. Here, latch receiver 204 is an elongated member with an opening to receive the distal end of latch 504. The opening provides a bar, transverse to entrance way 502, that latch 504 may engage when the distal end of latch 504 is in the opening.

Figure 7A:
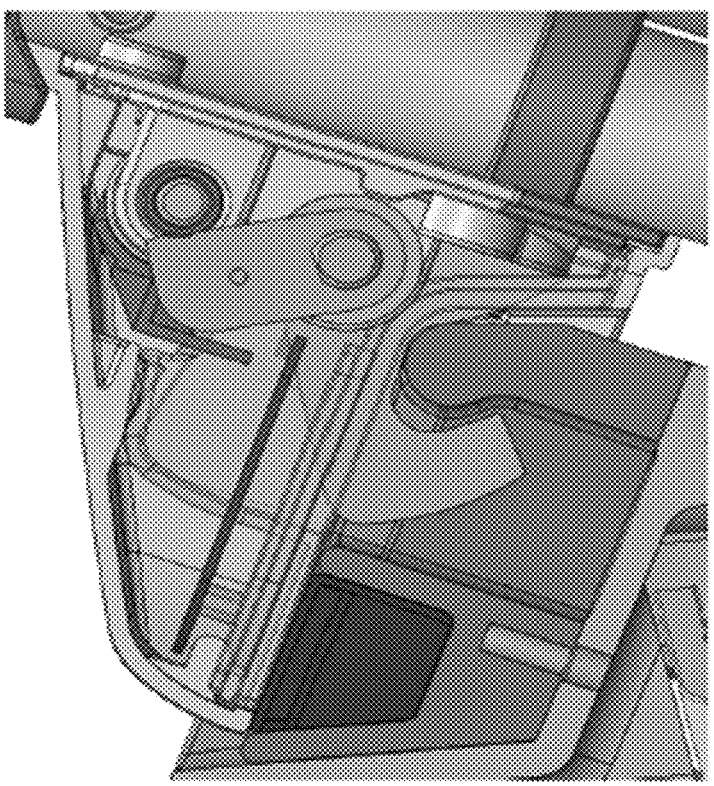
FIG. 7A is a cross-sectional view of an exemplary embodiment of a lock in a locked position.
Figure 7B:
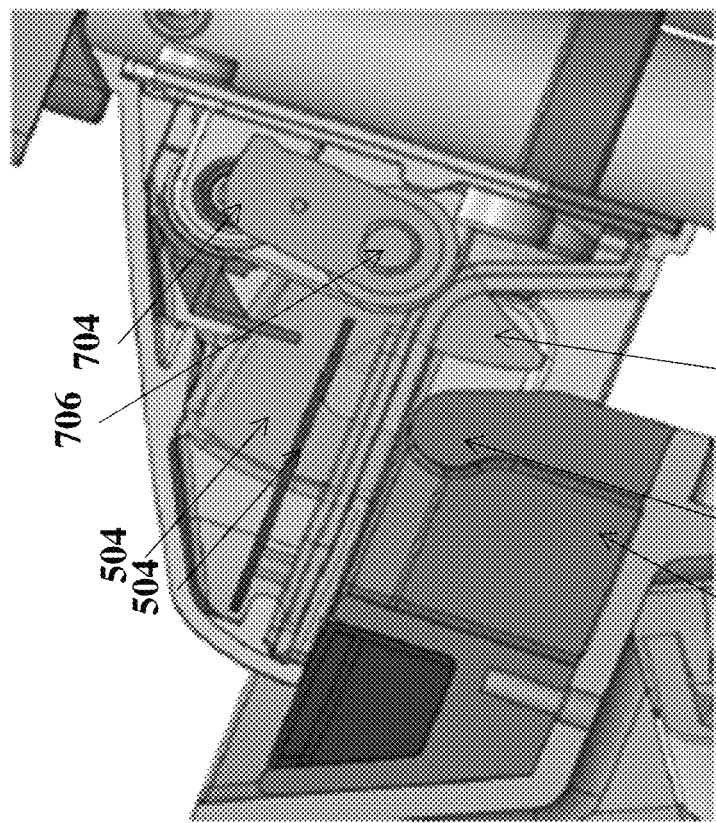
FIG. 7B is a cross-sectional view of the lock of FIG. 7A in an unlocked position.

FIG. 7A illustrate an embodiment in which latch 504 and lever 506 form two ends of a continuous C-shaped structure. The C-shaped structure is rotatable about shaft 706, on which arm 704 is also attached, coupling it to latch 504 and lever 506. As latch receiver 204 enters entrance way 502, complementary latching member 206 engages and pushes on lever 506. This pushing translates to torque, and lever 506 begins to rotates towards the end of entrance way 502. As lever 506 rotates, latch 504 rotates downwards, forming entering the opening on complementary latching member 206 and engaging complementary latching member 206. In the embodiment illustrated, the distal tip of latch 504 curls inwards and the wall of the opening that form complementary latching member 206 has a complementary curl such that latch 504 and complementary latching member 206 interlock, engaging the latch and complementary latching member, as shown in FIG. 7B.

Figure 8A:
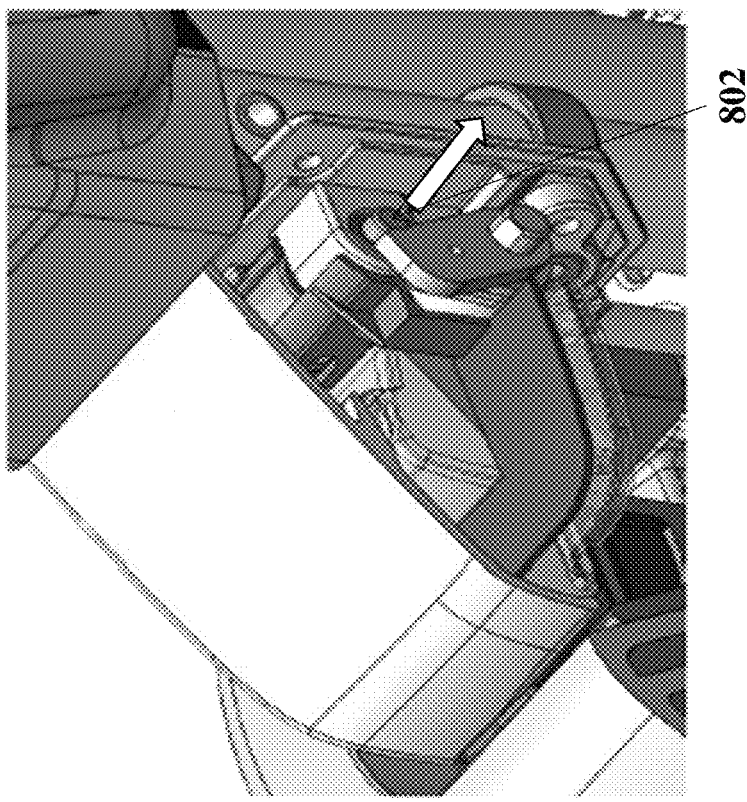
FIG. 8A is a left front perspective view of an exemplary embodiment of lock, partially cut away, in an unlocked position, annotated with an arrow indicating direction of motion or an arm to release a locking member to enable it to move into a locked position.
Figure 8B:
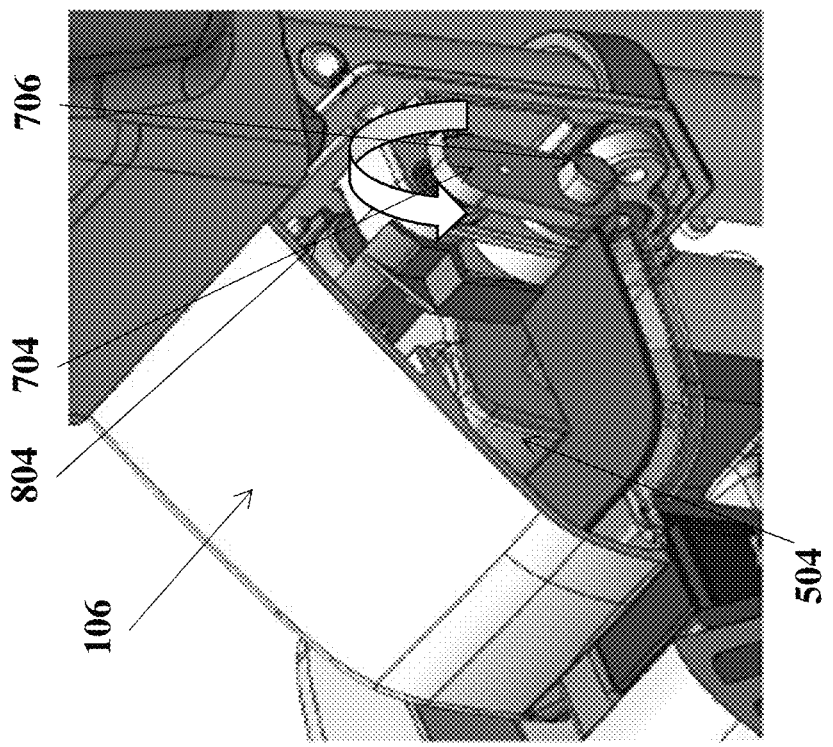
FIG. 8B is a left front perspective view of the lock if FIG. 8A, partially cut away, annotated with an arrow indicating direction of motion of locking member into a locked position when released.

As seen in FIG. 7B and again in FIGS. 8A-8B, as latch 504 rotates about a point of rotation provided by shaft 706, arm 704 rotates in the same direction from its unlocked position to its locked position. In the unlocked position, the arm obstructs locking member 802 from extending from its sheath. In this embodiment, locking member 802 is biased outwards such that, if not obstructed, it will extend and block rotation of arm 704. As arm 704 is fixedly coupled to latch 504, blocking rotation of arm 704 towards an unlocked position similarly blocks latch 504 from rotating into the unlatched position, thus holding the lock in its locked position.

In the embodiment illustrated, locking member 802 is a spring loaded pin. As arm 704 rotates enough to clear the locking member, locking member 802 extends outwards from its unlocked position to its locked position as seen in FIG. 8B. In this extended position, locking member 802 prevents arm 704 from rotating back from its locked position to its unlocked position. As a result, latch 504 is prevented from rotating and releasing complementary latching member 206, The first and second locking modules are prevented from being intentionally or unintentionally disengaged. Locking member 802 is spring loaded in this embodiment, but in other embodiments it can be extended into its locked position by actuator 804. Actuator 804 could be electric, pneumatic, hydraulic, or any suitable type of actuator for producing linear motion of the locking member 802.

Figure 9:
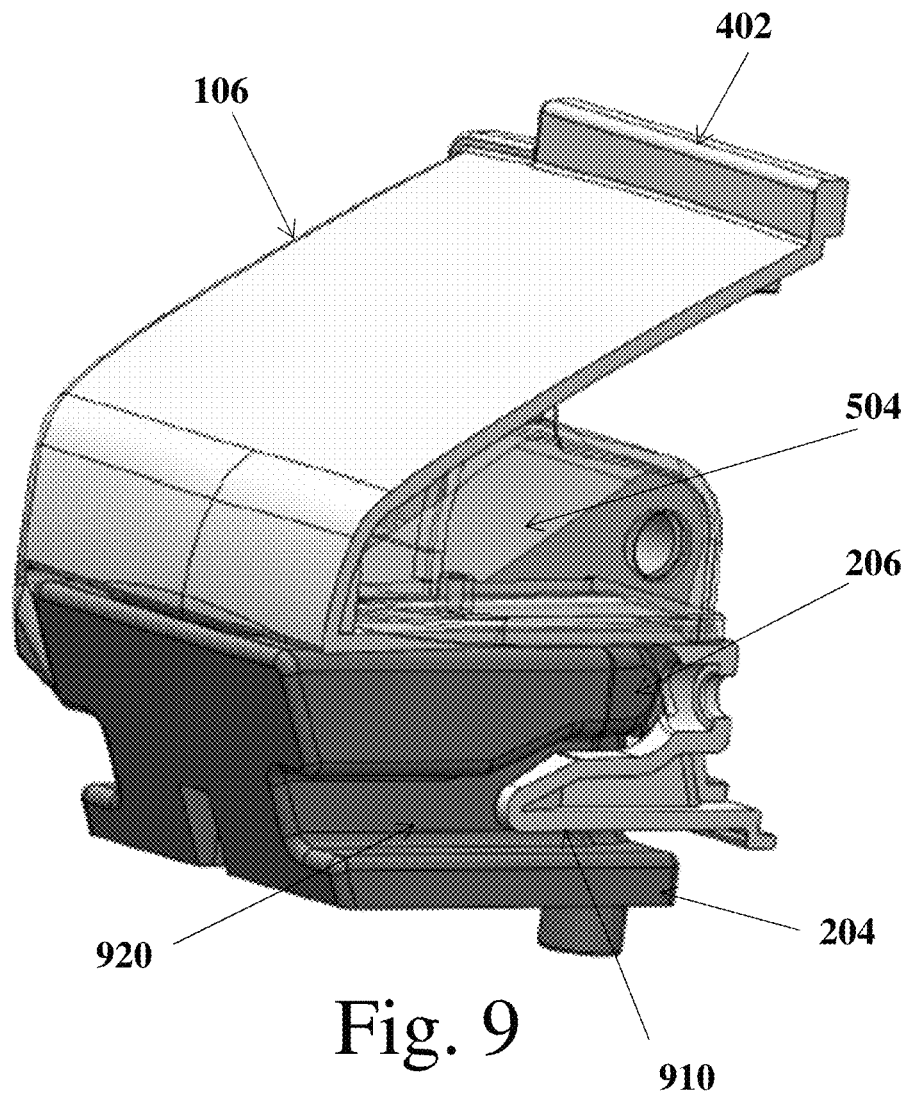
FIG. 9 is a left front perspective view of an exemplary embodiment of a lock and a complementary locking section on a dock, when the lock and complementary locking sections are mated.

FIG. 9 illustrates further features that may be included in a first and second locking modules. FIG. 9 illustrates the left sidewall of the housing of the first locking module first cut away. In this view, a tongue 910 of the housing is visible, as is a groove 920 on latch receiver 204. In the latched position, engagement between latch 504 and complementary latching member 206 primarily prevents latch 504 and latch receiver 204 from being separated by motion in a direction parallel to the elongate dimension of entrance way 502, which is the direction of insertion of a lock into the lock receiving section. Engagement of tongue 910 in groove 920 constrains relative motion of the lock and lock receiving section to this direction, making a more secure locking. For example, these components prevent a bicycle to which the lock is attached from being rotated into a position in which the latch 504 and complementary latching member 206 disengage, making it more difficult for an unauthorized user to defeat the locking system.

Figure 10B:
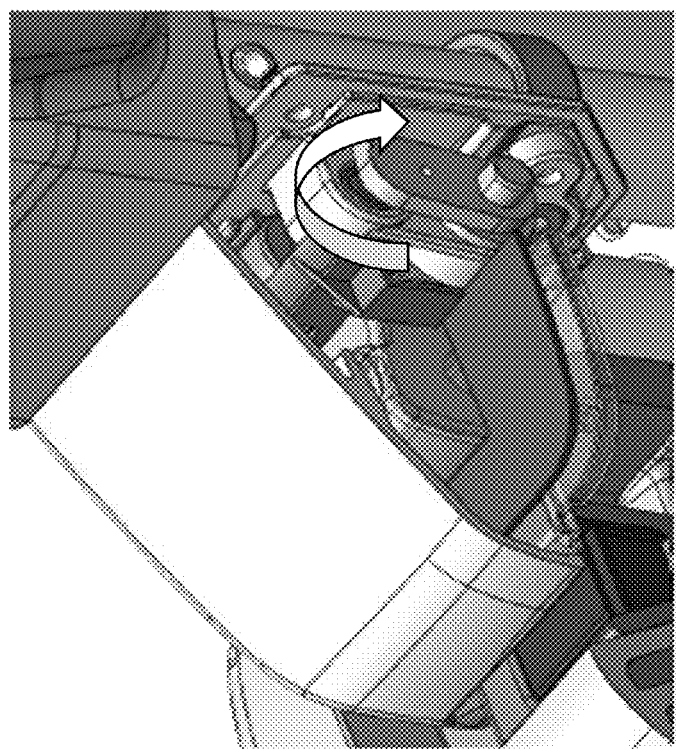
FIG. 10B is a left front perspective view of the lock if FIG. 10A, partially cut away, annotated with an arrow indicating direction of motion of an arm to secure a locking member into an unlocked position.
Figure 10A:
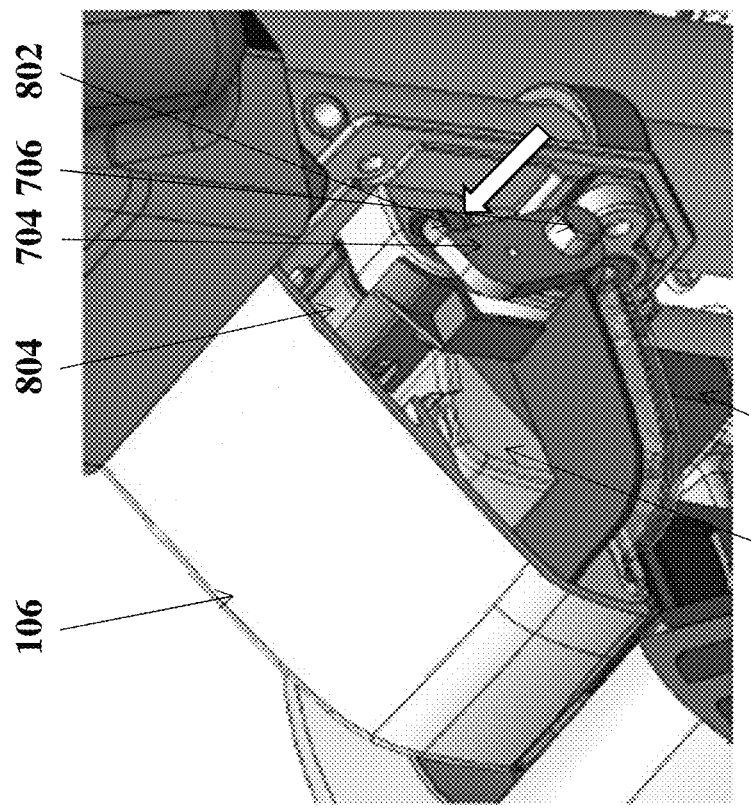
FIG. 10A is a left front perspective view of an exemplary embodiment of lock, partially cut away, in an unlocked position, annotated with an arrow indicating direction of motion of a locking member to move into an unlocked position.

FIGS. 10A and 10B shows the process of unlocking the bicycle. When actuator 804 is activated, it retracts locking member 802 back into its sheath. With the retraction of locking member 802, arm 704 and therefore shaft 706 and latch 504 are left free to rotate again. A user can then pull bicycle 100 outwards and away from the dock 102. Any suitable mechanism may be used to ensure that the latch 504 does not preclude the bicycle from being pulled out of the dock.

In some embodiments, the latch may be biased, such as with a spring, to rotate into an unlatched configuration when not locked. Alternatively or additionally, the latch may be driven by an actuator to move into the unlatched position when the lock is unlocked. However, in the embodiments illustrated, force on the bicycle resulting from a user moving it is transferred as a rotational force on the latch. In FIG. 10A, the force on the latch 504 being pulled against the complementary latching member 206 causes latch 504, lever 506, shaft 706, and arm 704 all to rotate back to their unlocked positions. Arm 704 returns to obstructing locking member 802 from escaping its sheath.

In the embodiment described, rotation of the latch and lever results in a functional reset of the locking mechanism and disengages the first and second locking modules 106 and 108. Other embodiments are considered where rotation of the latch, arm, and shaft are driven by an additional motor, or are manually actuated by a physical control means located outside of the housing. However, in the illustrated configuration, the actuator retracting locking member 802 may be released, such as by removing power to the actuator, once the arm has rotated to block extension of the locking pin.

Such a configuration enables a relatively small amount of power to be used for unlocking the bicycle from a dock. In this embodiment, a single actuator is powered for only a short time while a bicycle is being withdrawn from the dock. Moreover, no parts are actively driven during locking, as the energy to drive the latch into engagement with the complementary latching member and to lock it in place is provided by a user pushing a bicycle into the dock and releasing previously stored spring force.

Thus, the average power draw from a battery or other power source on the bicycle to drive mechanical motion of elements within the lock is very low. Sufficient power may therefore be supplied by a relatively small battery on the bicycle. That battery may be charged by a dynamo or in any other suitable way.

In some embodiments, the lock may include electronic components that may also draw power in some operating states. For example, those components may perform communication and/or control functions. As specific example, the lock may include a transmitter and/or a receiver and/or a processor. In some embodiments, the transmitter and/or receiver may be implemented with a cellular communication chipset available in the art. The processor may be a microcontroller or similar type processor programmed to perform functions as described herein. Alternatively or additionally, those components may include one or more position sensors, such as to sense the position of the latch and/or the locking member. Alternatively or additionally, an RFID reader, or other near field communication device, may be included in or near the lock housing to read a passive tag or other source of electronic information on the dock.

Those electronic components may, in some embodiments, be triggered to enter states in which they draw power based on mechanical motion of parts described herein. Alternatively or additionally, those parts may operate periodically to sense operating state and power down when a state is detected when no actions are required, such as controlling motion of the mechanical components or transmitting and/or receiving information from a bike share system controller. For example, the RFID reader may be triggered to operate only when the latch enters a latched position and the locking member then enters a locked position.

Figure 11:
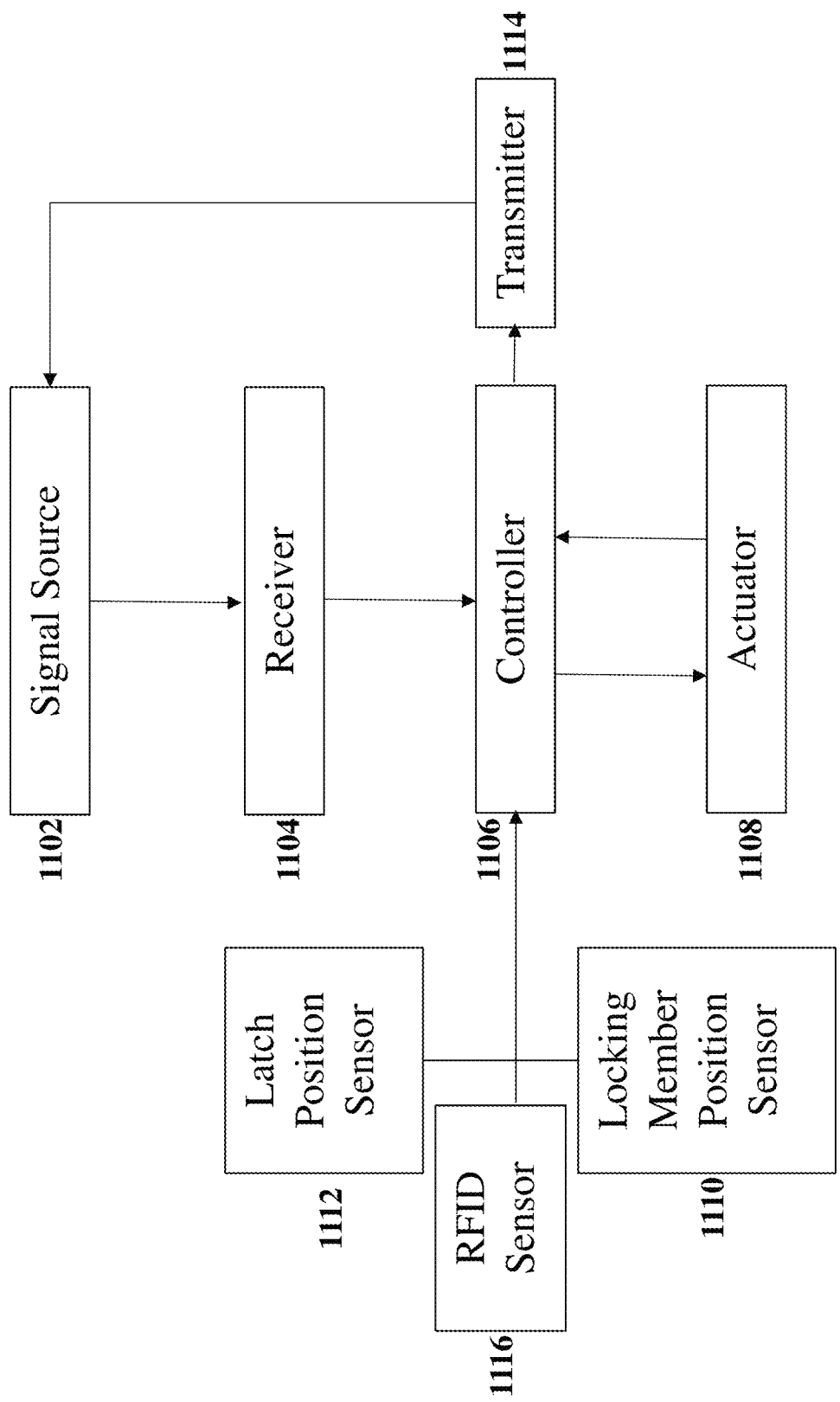
FIG. 11 is a functional block diagram illustrating a communication pathway between parts of the control system.

FIG. 11 is a flow chart that displays the high level sequence of communications between control devices within a bicycle lock and a controller for a bike share system. When a user wants to rent a bicycle, the user first initiates a request to unlock a bicycle. The user may initiate this action using a mobile phone, a dedicated remote controller, a control panel on the bicycle, a control panel on the dock, a web interface on a computer, or any other suitable input device. In some embodiments, that request may be communicated to a controller for a bike share system. That controller, for example, may be a central server that is coupled to the cellular telephone network.

The controller may determine whether to unlock a bicycle using any suitable processing. That processing could additionally require identity authentication, or process a payment before authorizing release, or alert a remote server that someone is attempting to retrieve a bicycle, or log the event, or a combination of the above depending on the embodiment. Regardless of the input mechanism and the form of processing, when a controller determines that a bicycle should be unlocked, that controller may act as a signal source 1102 that transmits a signal that acts as a command to unlock a bicycle.

A receiver 1104 within the first locking module 106 may receive that command signal, and pass the signal to a controller 1106, also within the first locking module. The controller 1106 may then read out the state of the actuator 1108, the state of the locking member from the locking member position sensor 1110 on or adjacent to the locking member 802, and the state of the latch position sensor 1112 located on or adjacent to the latch 540. The controller may use this information to determine the state of the system, and, if necessary for a user to remove the bicycle from a dock, generate a control signal that activates the actuator 804.

The controller 1106 may alternatively or additionally use the sensed information to determine whether the bicycle has been removed from the dock. For example, the sensors may indicate that the lock has gone from a locked to an unlocked state. Based on the sensed information, the controller 1106 may respond by removing power from the actuator.

Following the undocking process, the lock may remain in an unlatched and unlocked state. In this state, the user may dock the bicycle to the same or different dock. In the illustrated embodiment, the actuator need not be driven for the docking process. Rather, pressing the lock on a bicycle into a lock receiving member on a dock rotates the latch and releases the locking member. Accordingly, it is not a requirement that controller 1106 be active during the docking process.

However, upon docking, the controller 1106 may sense that the lock is locked to a dock, such as by receiving information from RFID sensor 1116, which may be positioned to read a tag on the dock. Controller 1106 may then control transmitter 1114 to transmit a signal indicating the information read from the dock. A message sent by transmitter 1114 may include any suitable information, such as a value read from the RFID tag and/or an identifier for the bicycle to which controller 1106 is attached.

In accordance with some embodiments, controller 1106 may be implemented as a state engine, with the current state determined by the sensed state of the actuator and sensor outputs. The possible states are shown in FIG. 12, in an embodiment in which sensors are provided to sense the state of the actuator (which in this embodiment is implemented as a motor), latch and locking member. The latch can be in either an open state or a closed state where the latch is up or down respectively. The locking member can be in either an open state or a closed state where the locking member is retracted or extended. The actuator can be in one of the "open" state, "locked" state, and some embodiments further have a "ready" state where the motor is primed to activate. The controller may be configured to control the actuator and/or transmitter based on the sensed state and an input received, such as a command received through the receiver, or a sensed change in the output of any of the sensors. Controller 1106 may be programmed to take appropriate actions upon transitions between states, such as engaging or disengaging the actuator. For example, some embodiments of the lock system utilize information about the state of the bicycle determine if it is safe to engage locking or unlocking by activating the actuator 804. As a specific example, if the locking member is already in a retracted position, actuator 804 would not attempt to retract the locking member to prevent jamming the motor.

Moreover, it should be noted that FIG. 12 illustrates that some states do not correspond to valid operating states. Controller 1106 may be programmed to recognize such invalid states and execute operations that reset the state of the lock. For example, if controller 1106 determines that the lock is locked by the bicycle, but the bicycle is not attached to a dock, the controller may reset the system, such as by engaging the actuator to move the locking member into an unlocked position.

Following some or all of the actions taken, in some embodiments, the controller 1106 may report the status of the bicycle 100 via the transmitter 1114.

In some embodiments, first locking module 106 further includes a battery for storing energy and powering the various control and signaling related parts of the lock system. This battery could be powered by a dynamo driven by the pedals of the bicycle, or charged with solar panels, or form an electrical connection with the dock or another electrical source. However, it should be appreciated that an energy storage device may be located in any suitable location on the bicycle.

In some embodiments of the lock system, the first locking module includes an RFID sensor 1116 on its outer housing. In these embodiments, the second locking module additionally includes an RFID tag embedded in its housing, adjacent to where RFID sensor 1116 on the first locking module would be when the two locking modules are mated together. The RFID sensor 1116 would read the RFID tag and report the ID of the dock and provide it to controller 1106. Controller 1106 may use this information in various ways, such as to report back to a third party server to maintain documentation of where bicycles are located. Additionally, the controller 1106 can receive signals from the RFID sensor to determine if the bicycle 100 and dock 102 have been mated properly based on the alignment of the RFID sensor and RFID tag. Other embodiments of the lock system use other sensor and tag combinations such as infrared sensors and bar codes, or QR scanners and QR codes.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

For example, an embodiment was described in which a locking pin is biased into a locking position and driven by an actuator into an unlocked position. However, the locking pin may be biased into an unlocked position and driven into a locked position. As another example, a latch may be spring biased into one of an open or closed position. The latch may be driven into the other of the open or closed position with an actuator or other power source. Alternatively or additionally, the latch may be driven through engagement with a camming surface or other portion of a complementary latching member. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

It should be understood that aspects are described herein with reference to certain illustrative embodiments and the figures. The illustrative embodiments described herein are not necessarily intended to show all aspects, but rather are used to describe a few illustrative embodiments. Thus, aspects are not intended to be construed narrowly in view of the illustrative embodiments. In addition, it should be understood that certain features disclosed herein might be used alone or in any suitable combination with other features.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A lock for removably securing a bicycle to a structure, the lock comprising:
a housing configured to mount to the bicycle, the housing supporting:
a latch movably mounted to the housing, wherein the latch is movable between a latched and unlatched position;
a locking member movably mounted to the housing, wherein the locking member is movable between a locked position in which the locking member blocks movement of the latch, and an unlocked position;
an arm attached to the latch, wherein the arm is movable with the latch such that the arm is adjacent to and blocking movement of the locking member into the locked position when the latch is in the unlatched position, and the arm is displaced from the locking member when latch is in the latched position; and
an actuator coupled to the locking member, wherein the actuator is configured to drive the locking member into at least one of the locked and unlocked positions.

2. The lock of claim 1, wherein:
the locking member is spring biased into the locked position; and
the actuator is configured to drive the locking member into the unlocked position.

3. The lock of claim 2, further comprising:
a lever attached to the latch, wherein the lever is configured to engage a complementary latching member on the structure, such that motion of the lock away from the structure applies force to the latch and the force is transmitted as a torque to the lever that moves the lever from the latched to the unlatched position, preparing the lock for future operations.

4. The lock of claim 2, further comprising:
a wireless receiver; and
a controller operatively coupled to the actuator, the controller being configured to, based on a command received through the wireless receiver, control the actuator to move the locking member from the locked to the unlocked position.

5. The lock of claim 4, further comprising:
a position sensor coupled to the latch;
an RFID sensor; and
a transmitter, wherein the controller is configured to control the transmitter to transmit a signal indicative of a value read with the RFID sensor based on the position sensor indicating that the latch is in the latched position.

6. The lock of claim 4, further comprising:
a position sensor coupled to the locking member;
an RFID sensor; and
a transmitter, wherein the controller is configured to control the transmitter to transmit a signal indicative of a value read with the RFID sensor based on the position sensor indicating the locking member is in the locked position.

7. A lock for removably securing a bicycle to a structure, the lock comprising:
a housing configured to mount to the bicycle, the housing supporting:
a latch movably mounted to the housing, wherein the latch is movable between a latched and unlatched position;
a locking member movably mounted to the housing, wherein the locking member is movable between a locked position in which the locking member blocks movement of the latch, and an unlocked position;
a spring, biasing the locking member towards the locked position; and
an arm attached to the latch such that the arm is positioned to block the locking member from moving from the unlocked position to the locked position when the latch is in the unlatched position, and such that rotation of the latch to the latched position causes rotation of the arm away from the locking member, allowing the locking member to enter the locked position.

8. The lock of claim 7, further comprising:
a lever attached to the latch, wherein the lever is configured to engage a complementary latching member on the structure, such that motion of the lock toward the structure applies force to the lever and the force is transmitted as a torque to the latch that moves the latch from the unlatched to the latched position.

9. The lock of claim 7, further comprising:
an actuator;
a wireless receiver; and
a controller operatively coupled to the actuator, the controller being configured to, based on a command received through the wireless receiver, control the actuator to move the locking member from the locked to the unlocked position.

10. The lock of claim 9, further comprising:
a position sensor coupled to the latch;
an RFID sensor; and
a transmitter, wherein the controller is configured to control the transmitter to transmit a signal indicative of a value read with the RFID sensor based on the position sensor indicating that the latch is in the latched position.

11. The lock of claim 9, further comprising:
a position sensor coupled to the locking member;
an RFID sensor; and
a transmitter, wherein the controller is configured to control the transmitter to transmit a signal indicative of a value read with the RFID sensor based on the position sensor indicating the locking member is in the locked position.

12. A method of removably securing a bicycle to a structure, the method comprising:
aligning a first locking section mounted to the bicycle with a second locking section mounted to the structure;
the first locking section comprising at least a rotatable latch and the second locking section comprising at least a complementary latching member;
rotating the rotatable latch in response to a force generated by bringing the first locking section and the second locking section together such that the latch is rotated into engagement with the complementary latching member in the second locking section;
rotating an arm with the latch to remove a restraint on motion of a locking member; and
when the restraint is removed on the locking member, moving the locking member into a locked position where the locking member blocks rotation of the latch into an unlatched position.

13. The method of claim 12, wherein the locking member is biased by a spring and moving the locking member into the locked position comprises moving the locking member based on force of the spring.

14. The method of claim 13, wherein:
bringing the first locking section and the second locking section together applies a torque to a lever continuous to the latch, rotating the latch into engagement with the complementary latching member in the second locking section.

15. The method of claim 12, further comprising:
a transmitter transmitting a signal indicative of a value read with a RFID sensor based on the state of a position sensor to indicate if the latch is in the unlatched position or a latched position.

16. The method of claim 12, further comprising:
a transmitter transmitting a signal indicative of the value read with a RFID sensor based on a state of a position sensor to indicate if the locking member is in the locked position.

17. A method of reversibly unsecuring a bicycle from a structure, the method comprising:
activating an actuator within a first locking section mounted on the bicycle, causing a locking member within the first locking section to move to an unlocked position out of engagement with a latch;
generating a force to rotate the latch by pressing a camming surface on the latch against a camming surface of the structure; and
rotating the latch and an arm coupled to the latch in response to the force, such that the arm shifts to an unlocked position adjacent to the locking member, preventing the locking member from extending into a locked position.

18. The method of claim 17, wherein:
rotating the latch further rotates a lever, priming it to act as a second camming surface for rotating the latch to an unlatched position.

19. The method of claim 17, further comprising the step of:
a wireless receiver signaling a controller to activate the actuator based on a command received through the wireless receiver.

20. The method of claim 19, further comprising the step of:
the controller controlling a transmitter to transmit a signal indicative of a value read with a RFID sensor further based on the state of a position sensor to indicate if the latch is in the unlatched position or a latched position.

21. The method of claim 19, further comprising the step of:
the controller controlling the transmitter to transmit a signal indicative of a value read with a RFID sensor based on the state of a position sensor to indicate if the locking member is in the unlocked position.

* * * * *